7066X
No Printed Specification Available
Sheffield & Ingraham.
Paddle Wheel.
No.
Patented May 17, 1832.
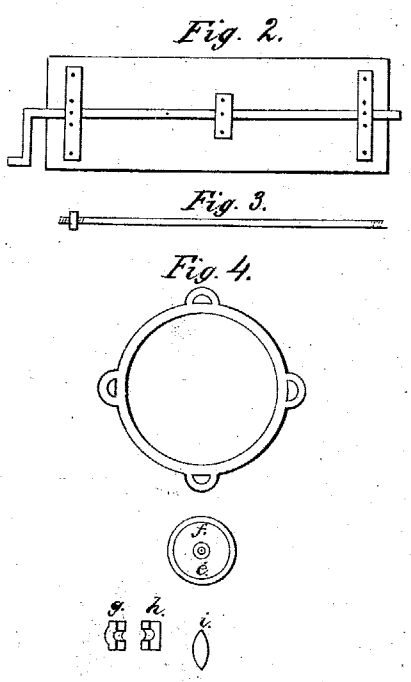
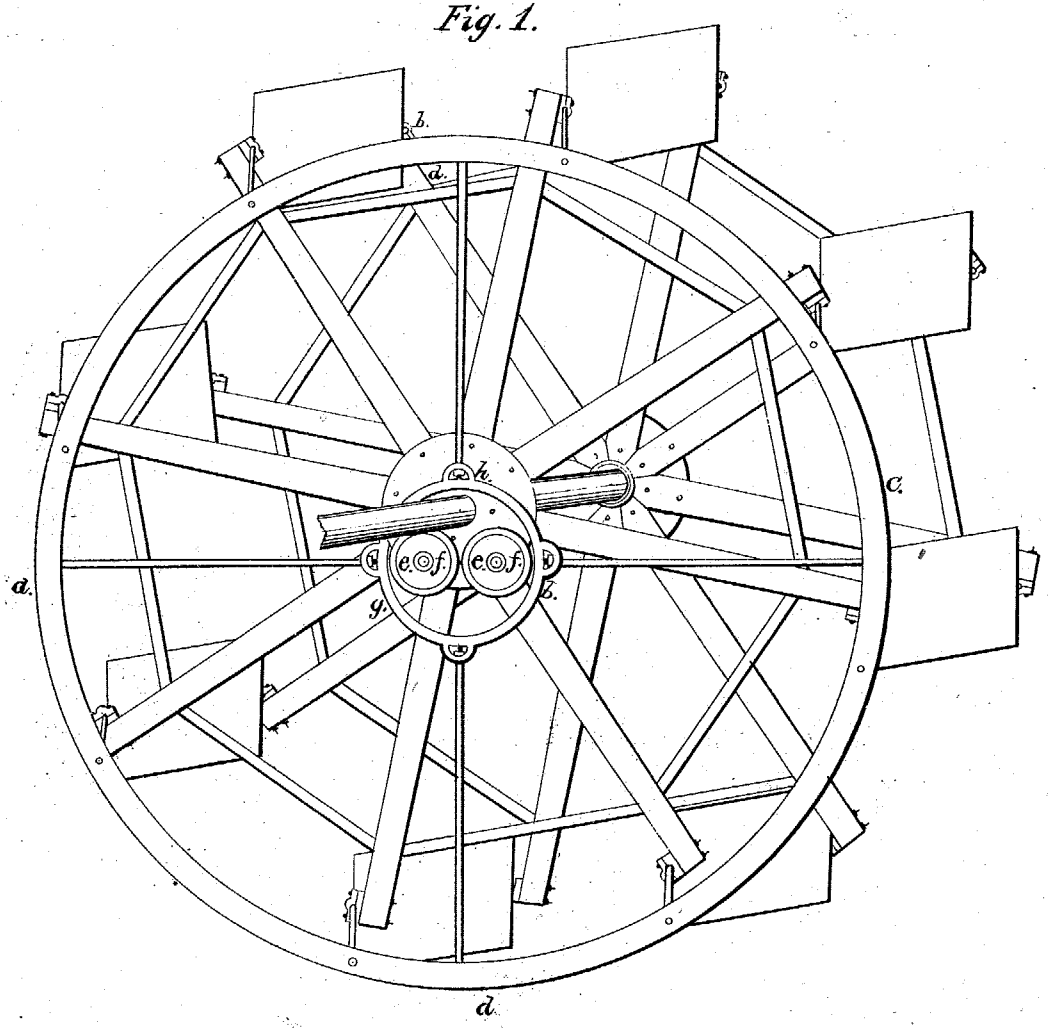
N. PETERS, PHOTO-LITHOGRAPHER, WASHINGTON, D. C.

John Sheffield & Jonas Ingraham, Citizens of the United States.
Letters Patent Dated May 17th 1832

The Schedule referred to in these Letters Patent, and making part of the same, containing a description in the words of the said John Sheffield and Jonas Ingraham themselves, of their Improvement in the machine for propelling Steam Boats, or other vessels and craft.

---

To all to whom these presents shall come, John Sheffield and Jonas Ingraham of the County of Erie, State of New York, send Greeting.

Be it Known that we, the said John Sheffield and Jonas Ingraham, have invented a new and useful improved wheel or machine not before known or used in propelling Steam Boats or other vessels and craft;— which invention and the manner of using and applying it is as follows.

The Improvement or wheel is constructed or built in the following manner; of suitable size & strength for the boat or vessel it is intended to propel, or for the purpose for which it is intended to be used.

The shaft, arms, flanches, and braces, are made in the same manner as those in wheels in common use. The flanches to be keyed on the shaft very true, so that the arms may exactly follow each other, as the wheel revolves, and that the gudgeons of the buckets may not bind.

The Buckets are made of iron and wood or of iron only, with an iron shaft running through the centre, and through the arm of ...... the wheel, forming them, on one end, if only one ring is used, a crank, see Fig. 2, which is inserted in the ring, as in Fig. 4. When two rings are attached to the wheel, then the shaft passing through the centre of the bucket and through the arms of the wheel, are to be made forming cranks at

7066X both the ends; both which cranks are to be inserted into both rings of the wheel in the manner above described. If the power wanted be so great as to require two sets of buckets, then either two or three rings may be attached to the wheel. If two rings only are used, then the second ring is to be attached to the opposite side of the wheel, the shafts of the second set of buckets, being inserted into a second set of arms, and forming cranks, on one end, inserted into the second ring, on the side next the guard of the vessel, in the manner and on the same principle as the buckets are when one ring only is used, as above described.

The third ring may if required be inserted between the two sets of buckets, the shafts of each set then forming cranks at both ends, and the shafts of both sets of buckets are inserted into the centre ring — as above described.

The Buckets may be made of iron and wood or cast iron alone. — or it may be necessary to make part of the buckets of iron and — part of iron and wood, to form counter balances. Those made of cast iron should be cast whole, so that the paddle, shafts and crank shall form but one solid piece, which is the preferable way of constructing them in cases where the weight is wanted to pass the centre; Where the buckets are made of Iron and wood, one half including the shaft & crank may be of cast iron, and the other part of wood, secured by — wrought Iron plates, fastened by screw bolts, to the part made of cast iron. When the wheel is required to be light, the buckets should be made of iron and wood, and be fastened to the shaft by screw bolts and plates, in such a manner as not to move or turn upon it. The gudgeons of the buckets are to be turned with collars, so as to prevent the shaft from spreading or — drawing in, as the wheel revolves. The Boxes, for the gudgeons of the buckets to run in, are made of two pieces of cast iron or other metal and are fastened into the ends of the arms

7066X of the wheel with two or more screw bolts.

The Shafts of the buckets, are made of equal length and fitted in the boxes of the arms of the wheel, so that the distance from the centre of the box in one arm, to the centre of the box in the opposite and corresponding arm, shall be the same in all the arms, describing equal radii and angles with the periphery of the wheel.

The ring of the wheel, measuring from the centre of the holes therein, receiving the shafts or journals of the buckets, to be made equal in circumference, to a circle described by a line passing through the centre of the boxes in the arms of the wheel, and its diameter equal to the distance from the centre of the box in one arm, to the centre of the box in the opposite and corresponding arm. And the holes in the ring, to receive the shafts or journals of the buckets, to be made in right lines with the perpendicular line of the wheel, corresponding exactly with the holes in the arms, so that the radii and angles described by both the ring and arms of the wheel, shall be equal, each revolving on its own centre.

A smaller ring (Fig. 1. h. k. g.) is made to keep the larger in its proper place, and placed in the centre of the larger one, its diameter measured on the inside, to be twice the length of the crank of a bucket, added to the diameter of the main shaft of the wheel; fastened to the centre of the larger ring by four iron rods, with nuts and revolving around two friction rollers (Fig. 1. e. f.) the rollers being fastened to the out side the Boat or vessel, by two large bolts. If the wheel be constructed with two large rings, then there must be two additional friction rollers, fastened to the guard of the boat or vessel to keep the second or outer ring in its place. The Petitioners only claim as their Invention, the main or larger Ring, the central ring, friction rollers & iron rods attached to the rings, by means of which the buckets are kept in a perpendicular position. This wheel 21 70664 may be used and applied for the propelling of Steam Boats and other vessels and water craft, as the common wheels, for such purpose, now in use are.

References.

Fig.1. Is a view of the wheel.

a, b, c, d, Main or Larger Ring h, h, g Central Ring, e, f, Friction Rollers.

Fig. 2, Bucket. Fig. 3. Iron Rod, Fig. 4, Central Ring. e, f, Friction Roller g, h, Boxes. i, section of main Ring cut at b, d, Fig. 1.

In witness whereof we have hereunto set & subscribed our names this twentieth day of December in the year of our Lord one thousand eight hundred and thirty one.

Witnesses.

Artemas Thompson Jun.

Henry Crawford

John Sheffield

Jonas Ingraham

Exd

WGC (1215 words)

Drawing